United States Patent
Cefaretti

[19]

[11] Patent Number: 6,162,038
[45] Date of Patent: Dec. 19, 2000

[54] RETRACTABLE DIE CLAMP FOR A PELLET MILL

[75] Inventor: Mark E. Cefaretti, Merrimack, N.H.

[73] Assignee: Consolidated Process Machinery, Inc., Merrimack, N.H.

[21] Appl. No.: 09/239,301

[22] Filed: Jan. 29, 1999

[51] Int. Cl.[7] ................. B29C 47/32; B30B 15/02; B30B 11/20
[52] U.S. Cl. ................. 425/186; 411/352; 411/353; 411/397; 411/999; 425/192 R; 425/193; 425/331; 425/DIG. 230
[58] Field of Search .................. 425/192 R, 193, 425/331, DIG. 230, 186, 194; 411/352, 353, 397, 999

[56] References Cited

U.S. PATENT DOCUMENTS

| | | | |
|---|---|---|---|
| 2,764,951 | 10/1956 | Fisher | 107/14 |
| 2,887,718 | 5/1959 | Curran et al. | 18/12 |
| 2,994,918 | 8/1961 | Landers | 18/12 |
| 3,632,279 | 1/1972 | Christy et al. | 425/450 |
| 5,542,838 | 8/1996 | Wilhelm et al. | 425/186 |
| 5,908,642 | 6/1999 | Veen et al. | 425/183 |

*Primary Examiner*—James P. Mackey
*Assistant Examiner*—Joseph S Del Sole
*Attorney, Agent, or Firm*—Nixon & Vanderhye

[57] ABSTRACT

The retractable die clamp for a pellet mill includes a clamp segment having a generally C-shaped cross-section with radial extending flanges for wedging the die ring flange and mounting or quill flange of the pellet mill frame against one another, securing the ring to the frame. The clamp includes end bolts threaded into the mounting flange. A centrally located Acme fastener has an externally threaded sleeve and a bolt extends through the sleeve and is threaded into the mounting flange. The Acme fastener also includes an internally threaded nut restrained on the clamp for limited axial movement. The nut is also rotatable relative to the clamp to back the clamp radially away from the mounting flange to retract the clamp from the ring and mounting flanges. The Acme fastener also maintains the clamp attached to the frame by the bolted connection when the clamp is backed off the mounting and die ring flanges.

5 Claims, 4 Drawing Sheets

RETRACTABLE DIE CLAMP FOR A PELLET MILL

TECHNICAL FIELD

The present invention relates generally to pellet mills having an annular ring die through which material, for example, feed products, is extruded to form pellets and particularly relates to a retractable die clamp for releasably securing the ring die to a frame on the pellet mill,

BACKGROUND

Pellet mills conventionally employ a die ring in which individual ingredients or mixtures (feed material) are agglomerated by compaction in a die cavity defined by an annular die ring and rollers within the die cavity. The compaction causes the feed material to be extruded through openings in the die ring to form pellets which are discharged as the final product from the pellet mill. Rotating die rings are common, although stationary dies ring may be used. For example, see U.S. patent application Ser. No. 09/192,436, filed Nov. 16, 1998.

In certain applications, particularly for pelletizing a variety of different feeds, it is necessary to change the die ring. For example, the die ring may be changed two or three times a day for different production runs. Typically, each die ring has a die flange which bears against and is clamped to a mounting or quill flange formed on a frame of the pellet mill. The mounting and die flanges are jointly rotatable or stationary, depending upon whether the die ring is rotatable or stationary. Clamps comprising circumferentially extending ring segments each having a generally C-shaped cross-section with radially extending wedge-type flanges are typically joined to the mounting flange by bolts to maintain the die ring flange and mounting flange secured to one another. The clamping force is maintained by torquing down the bolts securing the clamp segments to the mounting and die flanges. Typically, the segments are bolted to the flange using three circumferentially spaced bolts.

While this type of clamp has proved reliable for clamping the die and mounting flanges together, certain problems have arisen. For example, when changing die rings, considerable time is required to remove each fastener and to handle each clamp segment. It will be appreciated that each clamp segment must be completely removed from the pellet mill to release the die ring. This, in turn, causes further problems. As the dies are increased in size, the die clamp segments become heavier and more difficult to safely handle. Moreover, improper torquing of the clamps sometimes causes non-uniform circumferential distribution of clamping forces about the flanges, leading to failure. Also, as the dies increase in diameter to handle greater loadings, the size and number of clamps increase which in turn increases the die changing time.

An Acme fastener was developed to decrease the handling time. However, only one such fastener could be used per clamp due to its radial position about the die. Each such Acme fastener included an externally threaded sleeve, a bolt passing through the sleeve threaded to the mounting flange, and a lock nut internally threaded to the sleeve and secured against axial movement relative to the clamp. This Acme fastener, however, proved inadequate and failures occurred. Accordingly, there has developed a need for an improved die clamp for releasably securing an annular die ring to the mounting flange of the pellet mill.

DISCLOSURE OF THE INVENTION

In accordance with a preferred embodiment of the present invention, there is provided a retractable die clamp which minimizes or eliminates the foregoing and other problems associated with prior die clamps used in pellet mills and provides a novel and improved retractable die clamp enabling quick die changes and reduced handling time for the clamps. Additionally, the clamps are not removed from the pellet mill in their unclamped positions. Rather, the clamps are supported by the pellet mill frame in their unclamped positions. Moreover, in their clamped positions, the clamps afford substantially uniform stress distribution circumferentially about the mounting and die flanges.

To accomplish the foregoing, the present invention provides a segmented ring clamp for clamping the annular die ring to a mounting flange on the pellet mill wherein the clamp includes a combination of end bolts passing through opposite ends of the clamp for threaded engagement with the mounting flange of the pellet mill and an Acme-type fastener. Particularly, an Acme fastener is disposed intermediate the end bolts in a central opening of the clamp. The Acme fastener comprises an externally threaded sleeve, a bolt passing through the sleeve and threadedly engaging the mounting flange, and an internally threaded nut retained against axial displacement and mounted for rotation relative to the clamp. To apply the clamp to the ring and mounting flanges, the clamp segment overlies the flanges and is displaced radially inwardly to wedge the mounting and ring flanges between the clamp flanges. The clamp is displaced inwardly by torquing the end bolts which thereby secure the clamp to the flanges. The Acme fastener sleeve is fastened to the mounting flange by extending the bolt permanently through the sleeve and threading the bolt to the mounting flange. To release the annular die ring from the mounting flange, the end bolts are removed, i.e., unthreaded from their threaded engagement with the mounting flange. The nut of the Acme fastener is then rotated to retract the clamp relative to the ring and mounting flanges and also relative to the sleeve and bolt fixed to the mounting flange. The clamp segment is thus disengaged from and clears the die ring and mounting flanges. If the fit between the clamp segments and the die ring and mounting flanges is locked, additional jack bolts provided adjacent the ends of the clamp and which bear on the outer diameter of the mounting flange are used to break the locked fit. That is, the jack bolts are threaded into the clamp, causing the clamp to back off the mounting flange. It will be appreciated that by using this arrangement, the clamp is retained on the mounting flange by the Acme fastener when the die ring is replaced with a new ring. This eliminates the problem of handling the clamp segments during ring die changeovers and reduces the time necessary to change the die rings.

In a preferred embodiment according to the present invention, there is provided in a pellet mill including a frame having a mounting flange and an annular die ring having a plurality of circumferentially and axially spaced die openings about the ring and a die ring flange, a retractable arcuate clamp for releasably clamping the mounting and ring flanges to one another, the clamp having a generally U-shaped cross-section defining opposed clamping flanges for clamping at least portions of the mounting and ring flanges to one another between the clamping flanges, a pair of bolts passing through the clamp at circumferentially spaced positions therealong and threadedly engaging the mounting flange, and a fastener for displacing the clamp from a first position clamping the mounting and ring flanges to one another thereby securing the ring and the frame to one another to a second position spaced radially of the mounting and ring flanges enabling the ring for removal from the frame, the fastener including an externally threaded sleeve extending through an opening in the clamp between the bolts, a third bolt extending through the sleeve and securing the sleeve to the mounting flange, and an internally threaded nut passing through the opening and threadedly engaged with the externally threaded sleeve, the nut being rotatable in the opening in one direction to displace the clamp away from the flanges.

BEST MODE FOR CARRYING OUT THE INVENTION

Figure 1:
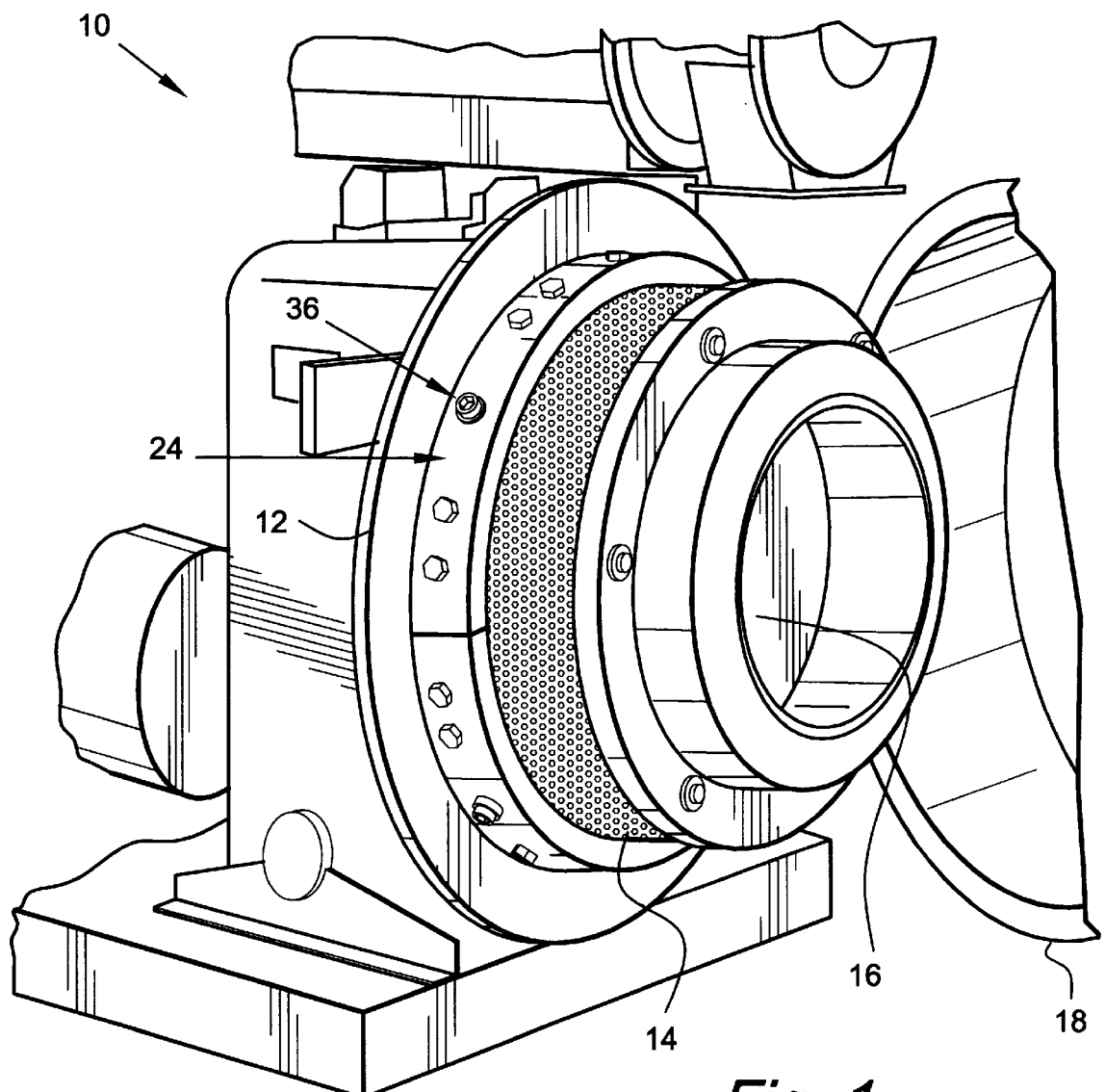
FIG. 1 is a fragmentary perspective view of a pellet mill illustrating a die ring secured to a frame portion of the pellet mill by retractable die clamps according to the present invention.

Referring now to FIG. 1, there is illustrated a pellet mill, generally designated 10, having a frame 12 on which is mounted a die ring 14 defining an interior feed cavity 16. Pellet mill 10 also includes a housing 18 for receiving pellets formed by the cooperation of the die ring 14 and two or more rolls, not shown, within the die cavity 16. It will be appreciated that the pellet mill receives feed material in the die cavity 16 which is agglomerated by compaction and extruded radially outwardly through the openings of the die ring to form pellets, all in a conventional manner. The die ring may be stationary or rotatable relative to the machine frame.

Figure 4:
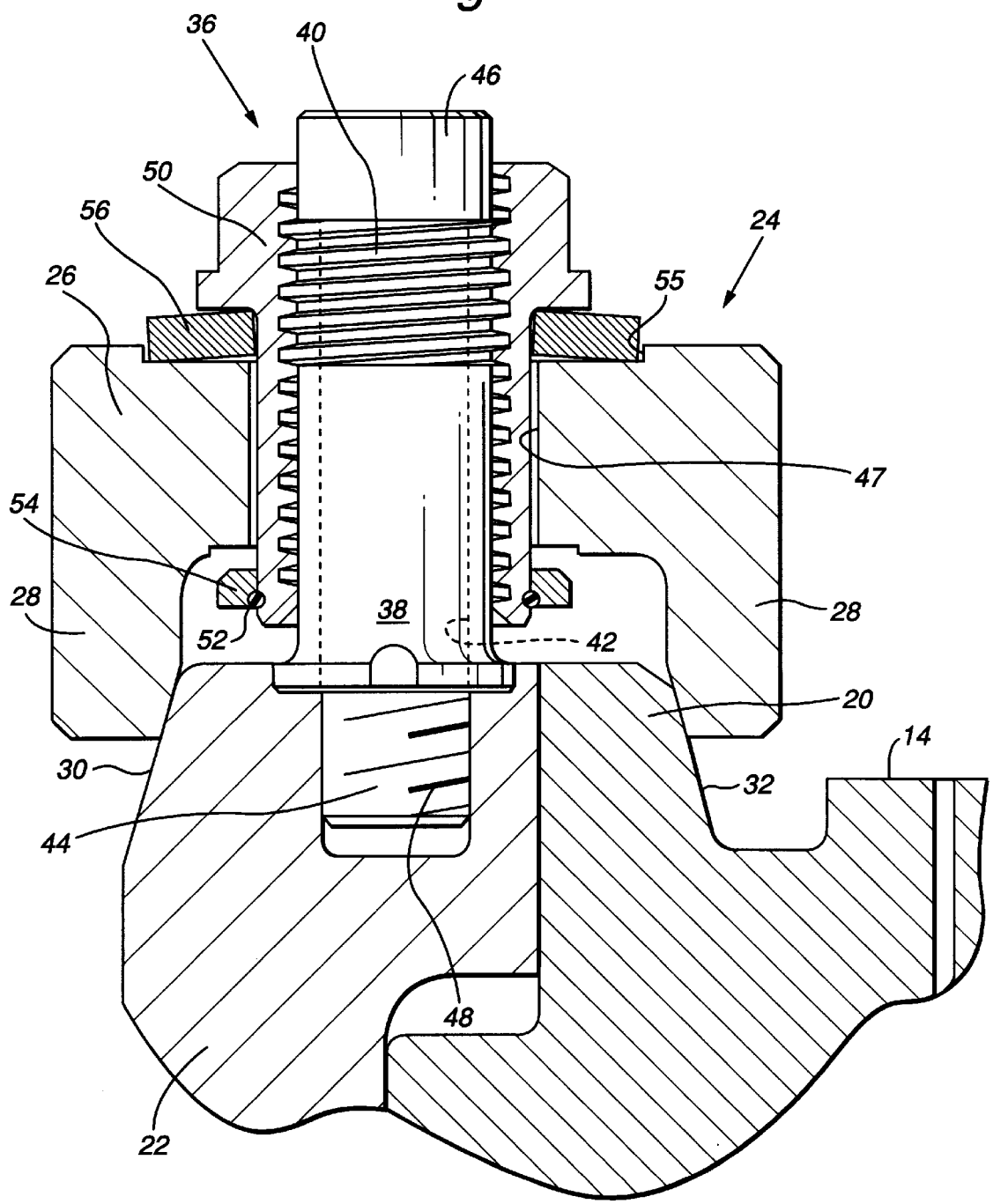
FIG. 4 is an enlarged fragmentary cross-sectional view illustrating the Acme fastener for the die clamp.

Referring particularly to FIG. 4, the die die 14 includes an annular mounting flange 20 which lies in axial registration and engagement with an annular mounting or quill flange 22 carried by the frame. A plurality of retractable die clamps, generally indicated 24, are circumferentially disposed about the mounting and ring flanges to maintain the die ring secured to the pellet mill frame. As illustrated in FIG. 4, each die clamp has a generally U-shaped cross-section with a base 26 and a pair of opposed wedging flanges 28. As illustrated in FIG. 4, the inside surfaces of the wedging flanges 28 are tapered complementary to the external tapered surfaces 30 and 32 of the mounting and ring flanges 22 and 20, respectively. Consequently, by displacing the clamp 24 radially inwardly, the mounting and ring flanges 22 and 20 are maintained in engagement by the wedging action of the clamp flanges.

Figure 2:
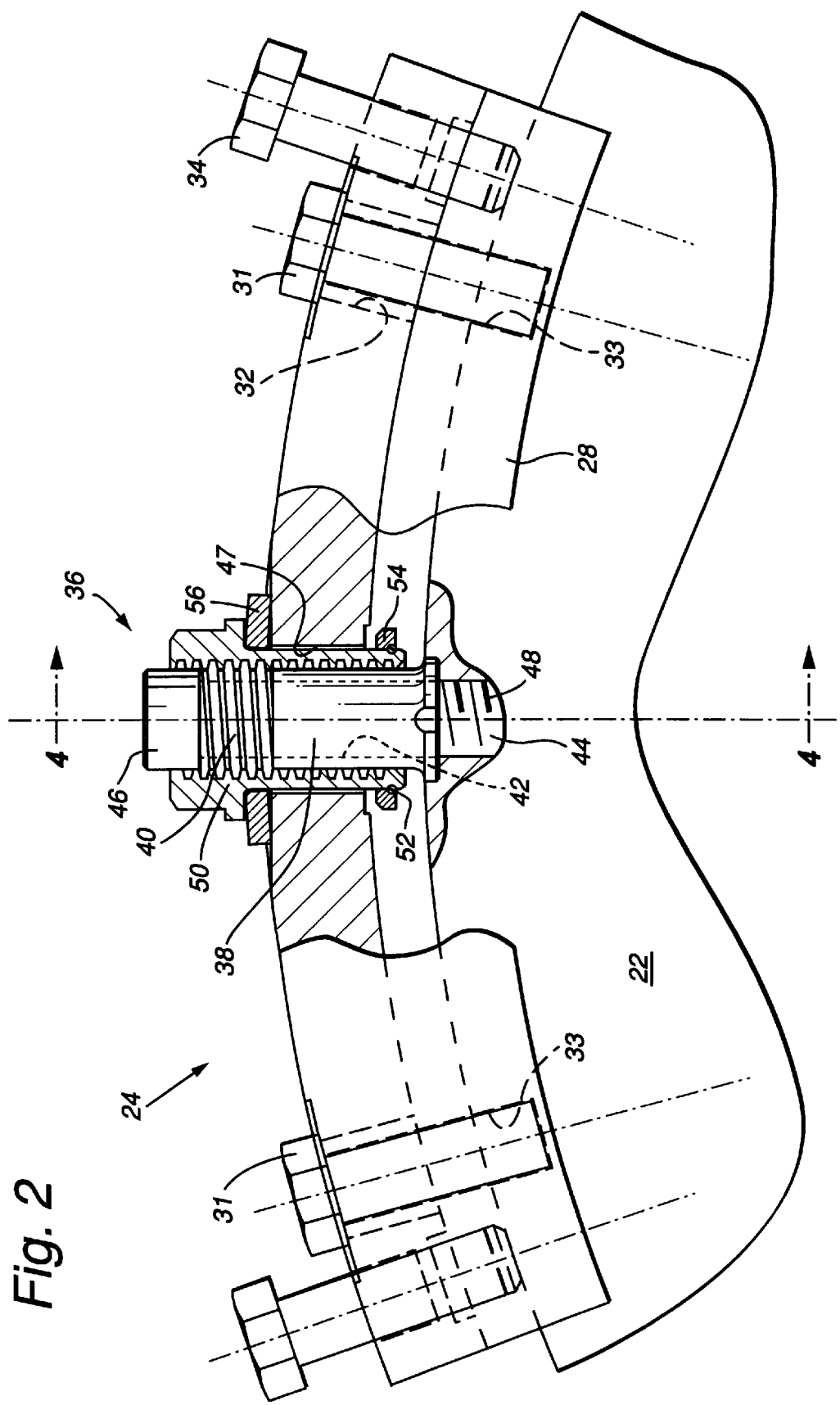
FIG. 2 is an enlarged fragmentary view of a die clamp with portions broken out and in cross-section and illustrated in a clamping position.

Referring to FIG. 2, there is illustrated a clamp segment which extends a predetermined circumferential distance about the mounting and die ring flanges. Thus, a selected number of retractable die clamp segments, for example, four or more segments, are disposed about the juncture of the die ring and mounting flanges to maintain the ring die and mounting flanges securely connected one to the other. As illustrated in FIG. 2, each retractable clamp 24 includes a pair of end bolts 31 which extend through end openings 32 for threaded engagement in female threaded openings 33 preferably in the mounting flange 22. It will be appreciated that the end bolts 30 could be threaded, if desired, into the ring flange. The end bolts 31 thus retain the clamp in position, clamping the mounting and ring flanges to one another. An additional pair of jacking bolts 34 are screwthreaded into opposite ends of the clamp 24 and bear against the outer diameter of the mounting flange 22. These end bolts 34 are employed to jack the clamp off the flange 22 when the fit between the clamp and the flanges 20 and 22 cannot otherwise be disrupted.

Referring to FIGS. 2 and 4, there is provided an Acme fastener, generally designated 36, enabling the clamp 24 to be retracted and retained on the mounting flange 22 when the end bolts 31 are unthreaded from the mounting flange 22. In this manner, clamp 24 is retained on and supported by the mounting flange while the ring die 14 is removed and a substitute ring die is mounted in its place. The fastener 36 includes a sleeve 38 which is externally threaded at 40 and has a central opening 42. A bolt 44 is received in the opening 42 and has a bolt head 46 at one end. Bolt 44 is threaded at 48 at its opposite end for threaded engagement with the mounting flange 22. It will be appreciated that the bolt 44 permanently secures the sleeve 38 to the mounting flange 22.

The clamp 24, of course, has an opening 47 for receiving the sleeve 38 and bolt 44. Opening 47 also receives an internally threaded nut 50 for threaded engagement with the threads 40 of sleeve 38. The inner end of nut 50 has a retaining ring 52 and a thrust washer 54 for bearing engagement along the underside of base 26 of clamp 24. The opening 47 is spot faced at 55 to receive a disk spring 56. Spring 56 biases the nut 50 in an outward direction. The nut 50 is rotatable in the opening 47 and is retained against substantial axial displacement by the thrust washer 54 and spring 56.

Figure 3:
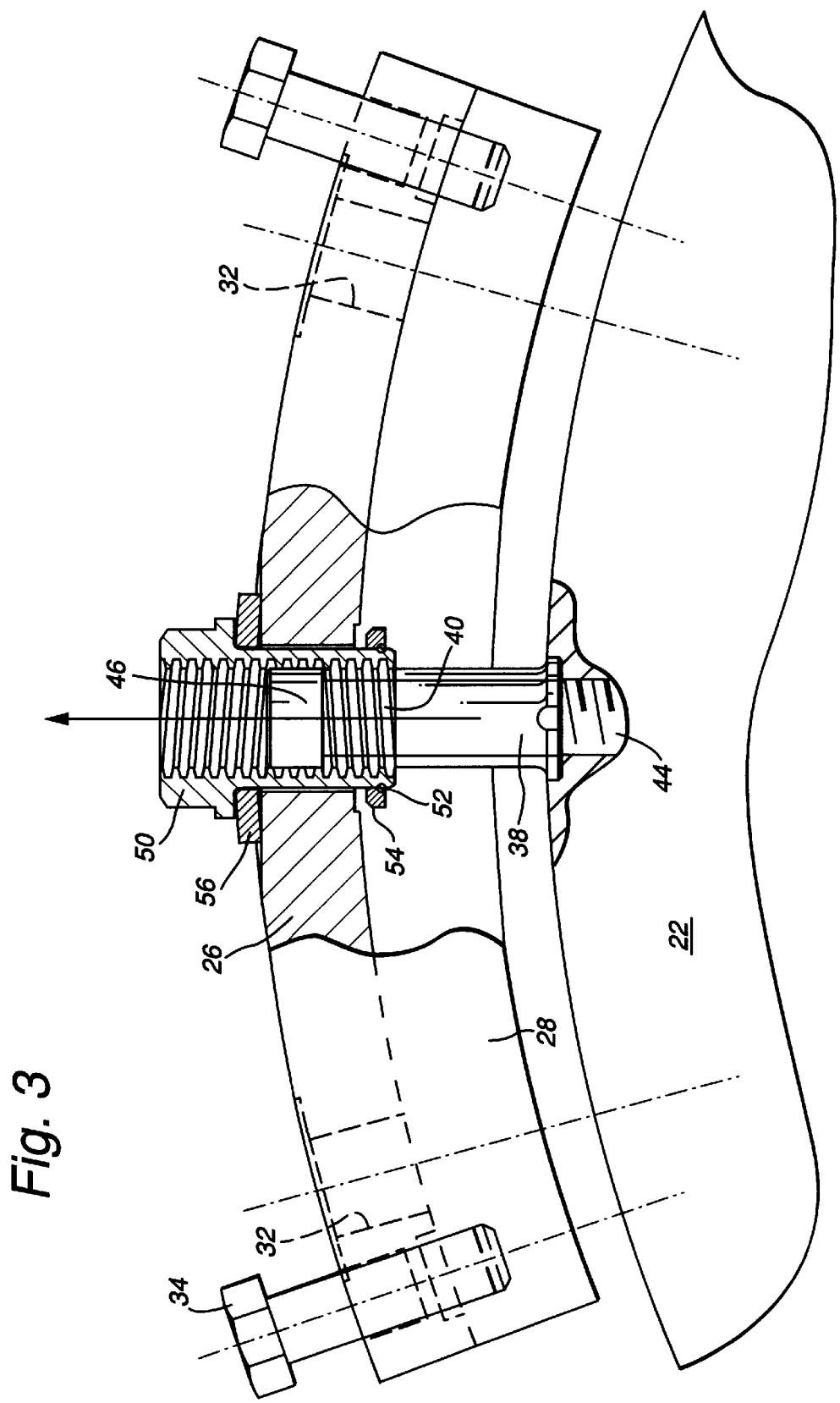
FIG. 3 is a view similar to FIG. 2 illustrating the clamp in a retracted position.

To release the ring die and mounting flanges 20 and 22, respectively, the end bolts 31 are unthreaded from the mounting flanges 22. By then rotating the nut 50 relative to the sleeve 38, the nut retracts relative to sleeve 38 and displaces the clamp 24 in a radial outward direction from its clamping position to an unclamping position clear of the flanges 20 and 22 as illustrated in FIG. 3. That is, after the end bolts 31 are first unthreaded from the mounting flange 22, nut 50 is rotated to bring the thrust washer 54 into engagement along the underside of the base 26 of the clamp 24 thereby to displace the clamp 24 outwardly to clear the mounting flanges while retaining the clamp on the mounting flange 22 during the changeover from one die ring to another. In the event the fit between the wedging flanges 28 and die ring and mounting flanges 20 and 22, respectively, is too tight and the nut 50 is unable to displace the clamp 24 away from the flanges, the other set of end bolts 34 are threaded into the clamp 24 to loosen the fit between the clamp 24 and the flanges 20 and 22. Once loosened, the nut 50 can be rotated so that the clamp clears the flanges while retaining the clamp on the mounting flange 22.

To clamp the new die ring onto the mounting flange 22, the nut 50 is rotated to displace the clamp radially inwardly to bring the wedging flanges 28 of clamp 24 into engagement with the mounting flanges 20 and 22. The bolts 31 are then threaded into the flange 22 to a predetermined torque to provide a substantially uniform circumferential stress distribution along the clamp. Also, the axial play of the nut 50 against the bias of spring 56 is sufficient to enable the bolts 31 to be torqued down without stressing the clamp. Thereafter, the jacking bolts 34 are threaded into position bearing against the mounting flange 22 as illustrated in FIG. 2. The jacking bolts 34 may alternatively bear against the ring die flange 20.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a pellet mill including a frame having a mounting flange and an annular die ring having a plurality of circumferentially and axially spaced die openings about said ring and a die ring flange, a retractable arcuate clamp for releasably clamping the mounting and ring flanges to one another, said clamp having a generally U-shaped cross-section defining opposed clamping flanges for clamping at least portions of said mounting and ring flanges to one another between said clamping flanges, a pair of bolts passing through said clamp at circumferentially spaced positions therealong and threadedly engaging said mounting flange, and a fastener for displacing said clamp from a first position clamping said mounting and ring flanges to one another thereby securing said ring and said frame to one another to a second position spaced radially of said mounting and ring flanges enabling the ring for removal from said frame, said fastener including an externally threaded sleeve extending through an opening in said clamp between said bolts, a third bolt extending through said sleeve and securing said sleeve to said mounting flange, and an internally threaded nut passing through said opening and threadedly engaged with said externally threaded sleeve, said nut being rotatable in said opening in one direction to displace said clamp away from said flanges.

2. A retractable clamp according to claim 1 wherein said nut carries a thrust washer adjacent an end thereof between said ring and mounting flanges and an undersurface of said clamp.

3. A clamp according to claim 1 wherein said nut includes a head and a spring between said head and an outer surface of said clamp for maintaining said nut in tension in said opening.

4. A clamp according to claim 1 wherein said nut carries a thrust washer adjacent an end thereof between said ring and mounting flanges and the clamp for engaging an undersurface of said clamp, said nut including a head and a spring between said head and an outer surface of said clamp for maintaining said nut in tension in said opening, said nut being dimensioned relative to an opening through said clamp receiving said fastener such that the nut has limited axial play relative to said opening.

5. A clamp according to claim 1 including a pair of jacking bolts threaded to said clamp, said jacking bolts bearing against one of said ring flange and said mounting flange and responsive to threading the jacking bolts relative to said clamp to break the clamping force between said clamp and the mounting and ring flanges.

* * * * *